United States Patent Office 3,201,418
Patented Aug. 17, 1965

3,201,418
DIBENZOTHIOPHENE AND DIBENZOFURAN DERIVATIVES
Ernest Bryson McCall, Llangollen, and Terence James Rawlings, Johnstown, Wrexham, Wales, assignors to Monsanto Chemicals Limited, London, England, a British company
No Drawing. Filed Nov. 29, 1961, Ser. No. 155,801
Claims priority, application Great Britain, Dec. 1, 1960, 41,362/60
9 Claims. (Cl. 260—329.3)

This invention relates to certain new heterocyclic chemical compounds which possess good thermal stability and can, for example, be employed as functional fluids.

There is a demand for chemical substances which are both liquid and stable at elevated temperatures, particularly if they are also relatively inert, because substances of this type find application in functional fluids, for instance heat transfer media. Other functional fluids where these substances are useful are hydraulic fluids which are required to operate at high temperatures.

It has now been found that certain new substituted dibenzothiophenes and dibenzofurans possess a combination of properties which makes them useful as functional fluids. The new compounds have a good heat stability, and they can be employed at what are relatively very high temperatures.

Accordingly the invention comprises a substituted dibenzothiophene or dibenzofuran of formula:

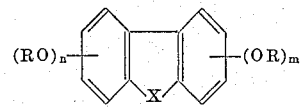

where X is selected from oxygen and sulfur, $n$ is an integer from 0 to 4, $m$ is an integer from 1 to 4, and each R is selected from

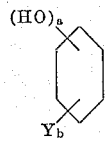

and

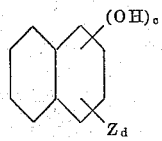

where $a$ and $c$ are integers from 0 to 1, $b$ and $d$ are integers from 0 to 2, Y is selected from alkyl of 1 to 12 carbon atoms, phenyl and phenylalkyl of 7 to 8 carbon atoms, and Z is alkyl of 1 to 4 carbon atoms. Although the free valence has been omitted from the basic radicals representing R, it will be readily apparent that such radicals are phenyl, α-naphthyl and β-naphthyl. Where X is a sulphur atom the compound is a dibenzothiophene, and where X is an oxygen atom the compound is a dibenzofuran.

The process of the invention is one for the production of a new dibenzothiophene or dibenzofuran, in which a compound of formula:

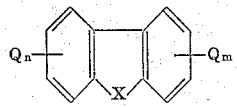

where Q is a halogen atom, e.g. chlorine, bromine, iodine and fluorine, and X, $n$ and $m$ are as defined above, is reacted with a salt of phenol, ROH, where R is as defined above.

Also part of the invention is a heat transfer system and a system for the transmission of power, in which there is employed respectively as heat transfer medium and as hydraulic fluid a new dibenzothiophene or dibenzofuran as defined above.

A single compound of the invention can be employed as a functional fluid, or a mixture of more than one of the compounds can be so employed. Moreover, a fluid can also include a substance known to possess thermal stability such as, for example, diphenyl or diphenyl ether.

In the general formula of the new compounds:

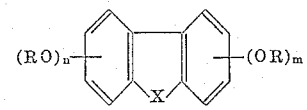

the groups R can be the same or different aromatic groups, and when $n$ or $m$ has a value of 2 or more, such two or more aromatic groups can be the same or different.

Illustrative members of the group from which each R is selected include phenyl, tolyl, o, m and p-xylyl, ethylphenyl, 2-ethyl-4-methylphenyl, n-propylphenyl, cumyl, n-butylphenyl, t-butylphenyl, 2,3-diamylphenyl, n-hexylphenyl, di(2-ethylhexyl)phenyl, n-decylphenyl, n-dodecylphenyl, benzylphenyl, phenylethylphenyl, phenylphenyl, hydroxyphenyl, cresyl, 2-hydroxy-4-isopropyl-1-methylphenyl, 1 - hydroxy-2,6-diisopropylphenyl, 2-ethyl-4-hydroxyphenyl, 3 - benzyl-4-hydroxyphenyl, α-naphthyl, β-naphthyl, 3 - methyl-α-naphthyl, 4 - ethyl-β-naphthyl, 2-isopropyl - α - naphthyl, α-hydroxynaphthyl, β-hydroxynaphthyl and the like.

Compounds having particularly excellent properties are those in which, in the formula, $n$ is an integer from 0 to 2, $m$ is an integer for from 1 to 2, and each R is a monocyclic aromatic hydrocarbon of from 6 to 11 carbon atoms. Thus the aforesaid excellent properties are obtained when each R is selected from phenyl and alkylphenyl wherein the alkyl group or groups contain up to 5 carbon atoms.

In the process of the invention, where the starting material is of formula:

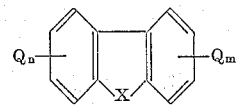

the group Q is preferably bromine, and the salt of the phenol, ROH, with which the compound is reacted is preferably a metallic salt, particularly a salt of an alkali metal such as sodium or potassium. There can for instance be employed a salt of phenol itself, o-, m- and p-cresol, 2,4-xylenol, 3,5-xylenol, 2,6-xylenol, o-, m- and p-phenylphenyl, p-benzylphenol, α- and β-naphthol, 3-ethyl-α-naphthol, and the like.

In applying the process to the preparation of a compound of the invention containing one or more identical aryloxy groups, the quantity of metallic phenate employed is generally at least sufficient to react with all the halogen in the starting material. Preferably there should be present an excess of the metallic phenate, for example an excess of 50%, 75% or 100%. If desired, however, the reaction can be carried out in stages, the first of which involves the use of sufficient metallic phenate to displace only part of the halogen of the starting material. This procedure is useful particularly when the compound of the invention required is one containing more than one type of aryloxy group. Mixtures of such compounds can of course be obtained by employing a mixture of metallic phenates in the first instance.

In carrying out the process of the invention, it is generally preferable to work an elevated temperature, for example one in the range of 100° to 300° C., and more particularly in the range of 150° to 250° C., for example 180° to 200° C. In many instances it is convenient to carry out the reaction in the presence of a high boiling solvent, although this is not necessary, provided the reactants are molten at the required reaction temperature. If a solvent is employed this can advantageously comprise the phenol whose salt is employed as a reactant.

A reaction time within the range of about 6 to 12 hours, for instance about 8 hours, is generally required to complete the reaction, although in certain instances a shorter or longer period may be necessary. In some cases the presence of a small amount of catalyst, such as for instance copper bronze, will accelerate the reaction.

The invention is illustrated by the following examples.

*Example 1*

This example describes the preparation of 2-phenoxydibenzothiophene from 2-bromodibenzothiophene and potassium phenate.

Potassium phenate was prepared by adding a solution of 14 grams (0.24 mol.) of potassium hydroxide in 14 cc. of water to 38 grams (0.4 mol.) of phenol and distilling the mixture until all the water had been removed. A further 17 grams of phenol were then added to the potassium phenate together with 36.8 grams (0.14 mol.) of 2-bromodibenzothiophene and 0.5 gram of copper bronze. The mixture was heated at 185–195° C. for 8 hours and then cooled and washed with water, giving a solid layer which was separated and dried in an oven at 70° C. The dry solid was purified by distillation to give 14.7 grams (38% of theory) of 2-phenoxydibenzothiophene, having a boiling point of 198–200° C. at 0.1 mm. of mercury pressure. After crystallization from ethanol, the product was obtained as colorless needles, melting point 125–126° C.

Found: C, 77.8%; H, 4.4%; S, 11.7%. $C_{18}H_{12}OS$ requires: C, 78.3%; H, 4.4%; S, 11.6%.

The thermal stability of 2-phenoxydibenzothiophene was assessed by subjecting it, in an isoteniscope, to a gradually increasing temperature. Its "decomposition temperature," defined as the temperature at which its isothermal vapor pressure increased by 0.84 mm. of mercury per minute, was 450° C. The 2-phenoxydibenzothiophene was in fact suitable for use as a functional fluid, for instance as a heat transfer medium, within a temperature range of about 150° C. to 440° C.

*Example 2*

This example describes the preparation of 2,8-diphenoxydibenzothiophene from 2,8-dibromodibenzothiophene.

To potassium phenate, prepared as described in Example 1 from 25.3 grams (0.266 mol.) of phenol and an aqueous solution containing 9.3 grams (0.16 mol.) of potassium hydroxide, there were added 22.8 grams (0.066 mol.) of 2,8-dibromodibenzothiophene, 11.3 grams of phenol and 0.2 gram of copper bronze, and the mixture was heated at 200–210° C. for 12 hours. At the end of this time the reaction mixture was cooled, and the desired product was isolated as described in the previous example.

There were obtained 16 grams (41% of the theoretical yield) of 2,8-diphenoxydibenzothiophene having a boiling point of 230–294° C. at a pressure of 0.1 mm. of mercury. After crystallization from a mixture of 3 parts by volume of petroleum ether and 1 part by volume of benzene, the product was obtained as colorless needles, melting point 155–156° C.

Found: C, 78.2%; H, 4.5%; S, 8.7%. $C_{24}H_{16}O_2S$ requires: C, 78.3%; H, 4.4%; S, 8.7%.

Above 156° C. the 2,8-diphenoxydibenzothophene was a liquid which was thermally stable up to at least about 430° C., its "decomposition temperature" being 446° C.

Following the procedures set forth in detail in Examples 1 and 2, other exemplary compounds of this invention are prepared. Such other exemplary compounds include:

2-tolyloxydibenzothiophene
4-o-cresyloxydibenzothiophene
2,4-bis(p-phenylphenoxy)dibenzothiophene
2,8-diphenoxy-4-m-cresyloxydibenzothiophene
4,8-dibenzylphenoxydibenzothiophene
2-dodecylphenoxy-8-n-propylphenoxydibenzothiophene
2,4,8-tri(p-xylyloxy)dibenzothiophene
4-α-hydroxynaphthyloxydibenzothiophene
2,8-ditolyloxydibenzothiophene
2,4,6,8-tetraphenoxydibenzothiophene
4,6-di(3-methyl-α-naphthyloxy)dibenzothiophene
2,4-dihexylphenoxy-8-m-xylyloxydibenzothiophene
2,8-diphenoxy-4,6-ditolyloxydibenzothiophene
2-phenoxydibenzofuran
1-α-naphthyloxydibenzofuran
2,4,8-triphenylphenoxydibenzofuran
2,4-dicumyloxydibenzofuran
2-phenoxy-4-naphthyloxydibenzofuran
2,8-di(2-ethylhexylphenoxy)dibenzofuran
4-phenylethylphenoxydibenzofuran
2-p-cresyloxydibenzofuran
2-cumyloxy-8-naphthyloxydibenzofuran
2,8-ditolyloxydibenzofuran
2-tolyloxydibenzofuran
2,8-diphenoxydibenzofuran
2,6-dinaphthyloxy-4-tolyloxydibenzofuran
2,4,6,8-tetracumyloxydibenzofuran
4,6-di(β-hydroxynaphthyloxy)dibenzofuran
2,4,8-tri(p-xylyloxy)dibenzofuran
4-(2-isopropyl-α-naphthyloxy)dibenzofuran While the invention has been described herein with respect to several specific embodiments, it is not so limited. It is to be understood that modifications and variations of this invention, obvious to those skilled in the art, may be made without departing from the spirit and scope of said invention.

The embodiments of this invention in which an exclusive property or privilege is claimed are defined as follows:

1. A compound of the formula

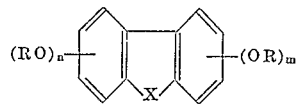

where X is selected from oxygen and sulfur, $n$ is an integer from 0 to 2, $m$ is an integer from 1 to 2, and each R is monocyclic aromatic hydrocarbon of from 6 to 11 carbon atoms, said hydrocarbon being free of olefinic and acetylenic unsaturation.

2. Phenoxydibenzothiophene.
3. Phenoxydibenzofuran.
4. Diphenoxydibenzothiophene.
5. Diphenoxydibenzofuran.
6. Tolyloxydibenzothiophene.
7. Tolyloxydibenzofuran.
8. Ditolyloxydibenzothiophene.
9. Ditolyloxydibenzofuran.

References Cited by the Examiner

Noller: Textbook of Organic Chemistry, second edition, 1958, page 102.

Ullmann et al.: Annalen der Chemie, vol. 350, pages 83–90.

WADC TR 59–173, "Nuclear Rad. Resist. High Temp. Lubricants," Defense Documentation Center (1959), page 17.

WALTER A. MODANCE, *Primary Examiner.*

IRVING MARCUS, *Examiner.*